No. 804,217. PATENTED NOV. 14, 1905.
J. A. COLQUHOUN.
KEY FOR KEYING RAILWAY RAILS TO CHAIRS.
APPLICATION FILED OCT. 6, 1904.
6 SHEETS—SHEET 1.
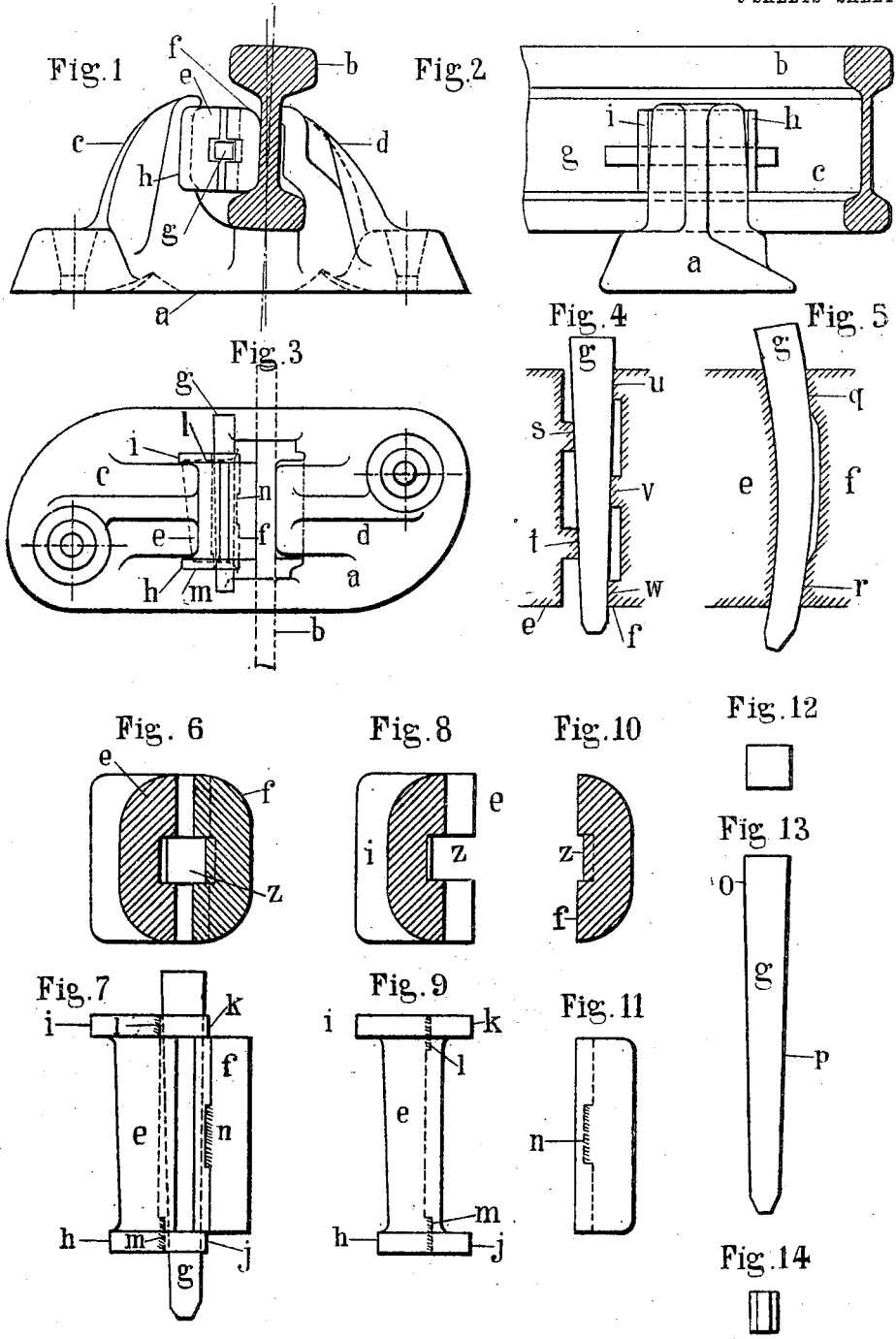

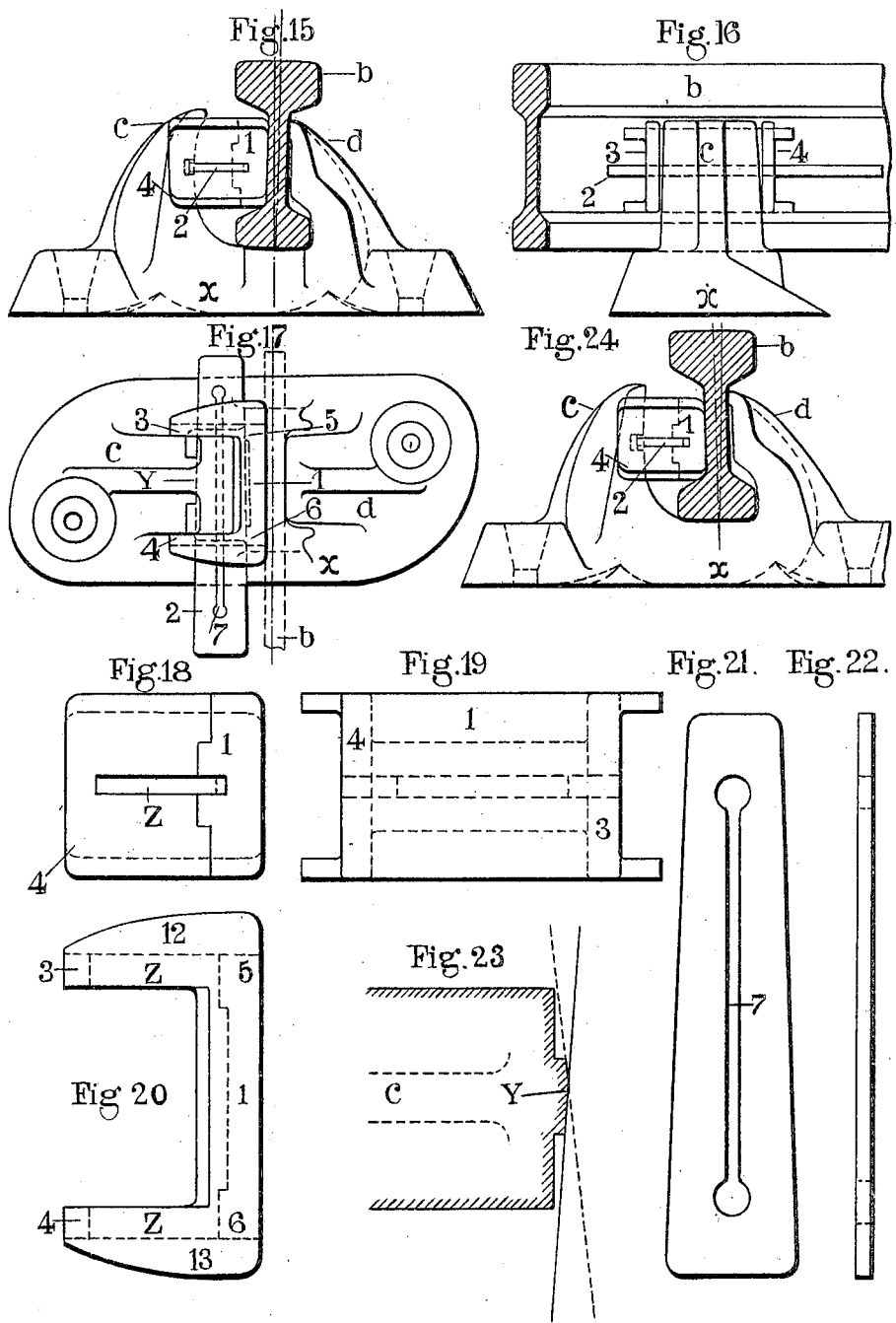

No. 804,217. PATENTED NOV. 14, 1905.
J. A. COLQUHOUN.
KEY FOR KEYING RAILWAY RAILS TO CHAIRS.
APPLICATION FILED OCT. 6, 1904.
6 SHEETS—SHEET 3.
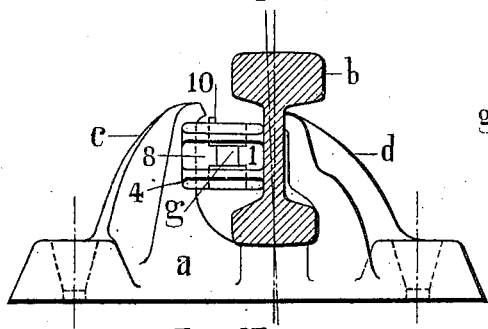
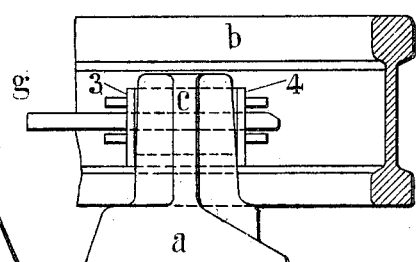
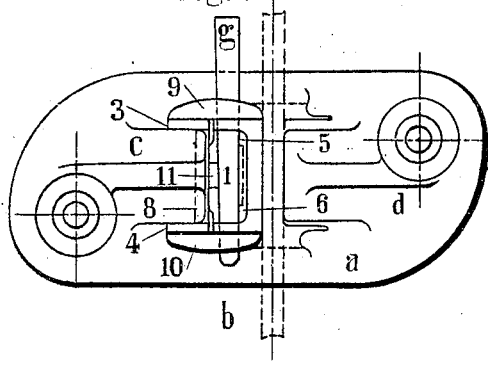
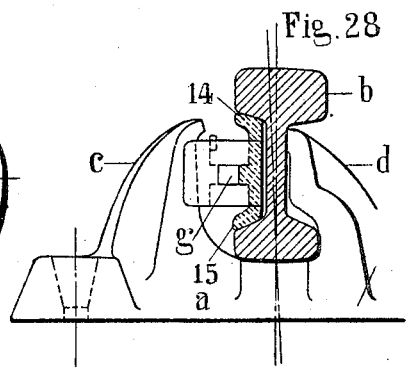
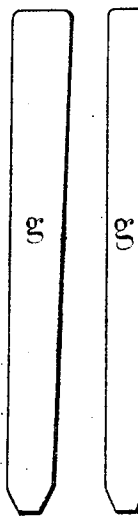
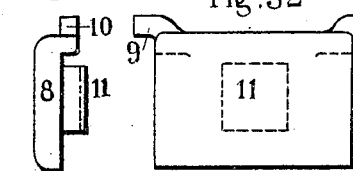
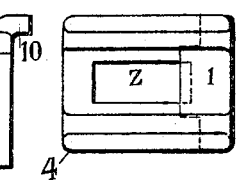
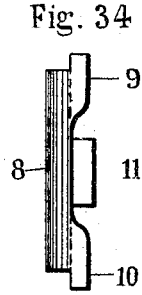
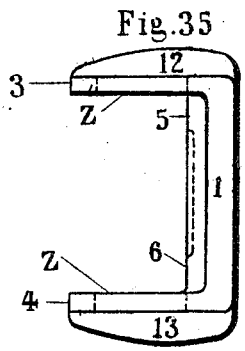
Witnesses
N. Mitchell
George R. Morz
Inventor
John Alexander Colquhoun
by his Attorney
R. Hadden

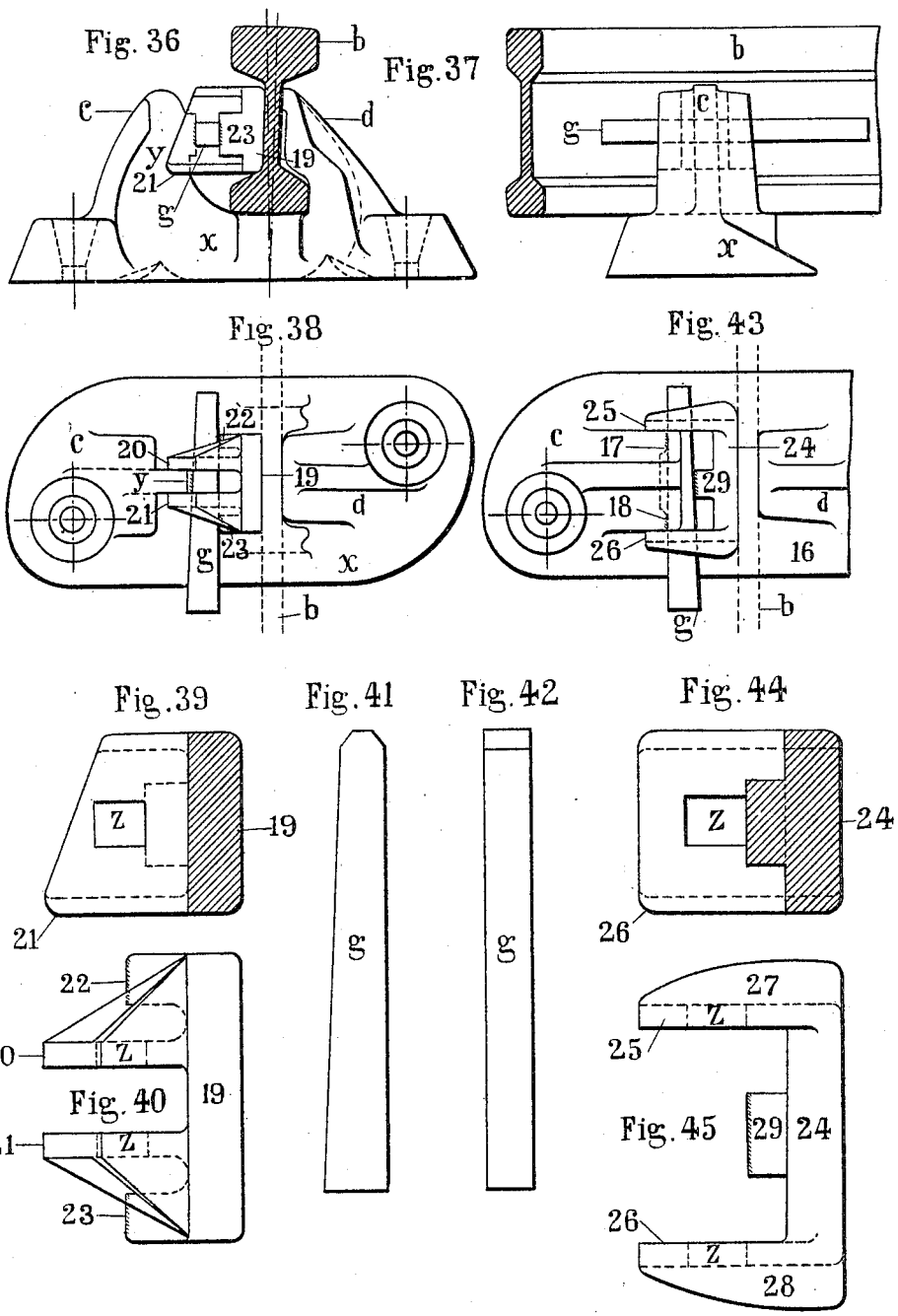

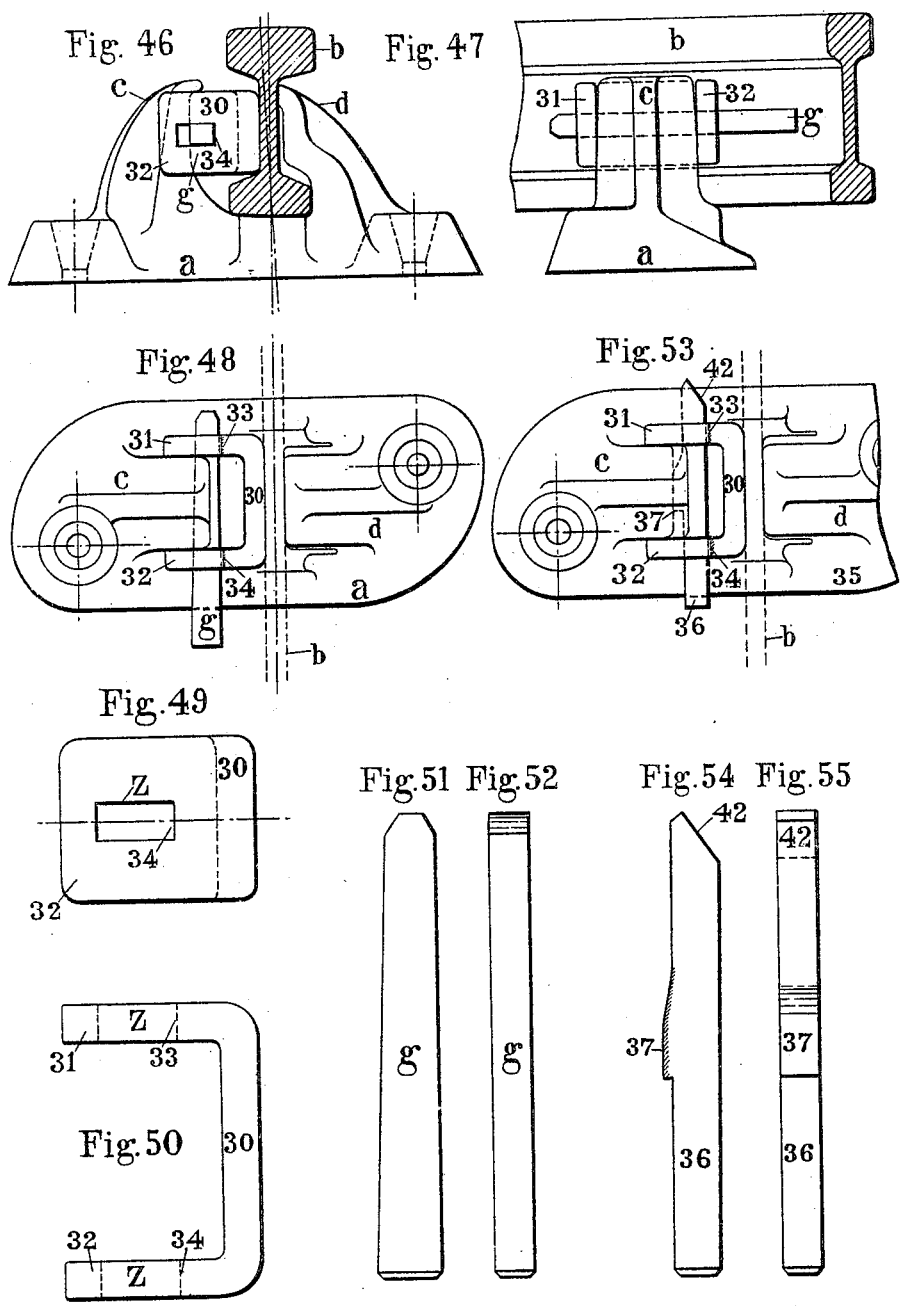

No. 804,217. PATENTED NOV. 14, 1905.
J. A. COLQUHOUN.
KEY FOR KEYING RAILWAY RAILS TO CHAIRS.
APPLICATION FILED OCT. 6, 1904.
6 SHEETS—SHEET 6.
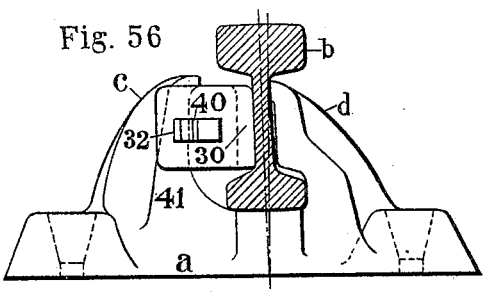
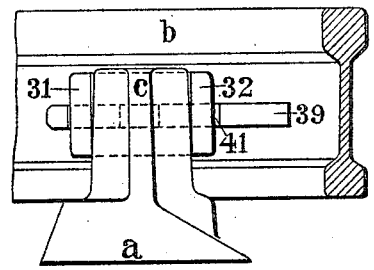
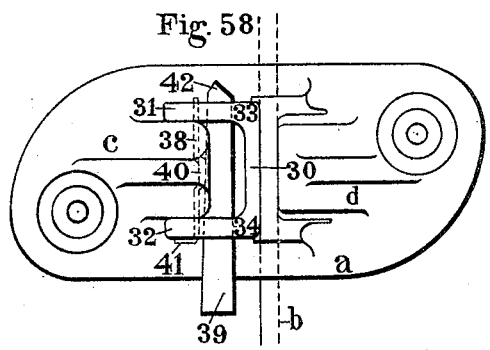
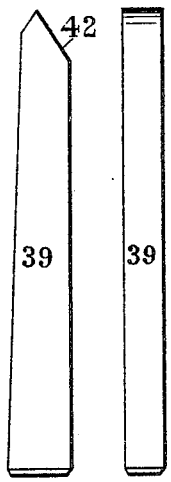
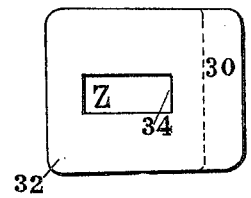
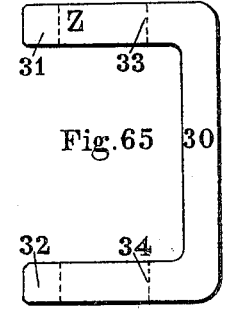
Witnesses
Inventor
John Alexander Colquhoun
by his Attorney

UNITED STATES PATENT OFFICE.

JOHN ALEXANDER COLQUHOUN, OF CALCUTTA, INDIA.

KEY FOR KEYING RAILWAY-RAILS TO CHAIRS.

No. 804,217. Specification of Letters Patent. Patented Nov. 14, 1905.

Application filed October 6, 1904. Serial No. 227,481.

*To all whom it may concern:*

Be it known that I, JOHN ALEXANDER COLQUHOUN, a subject of the King of England, residing at Calcutta, India, have invented certain new and useful Improvements in Keys for Keying Railway-Rails to Chairs, of which the following is a specification.

This invention relates to the fastening of railway-rails to the chairs in permanent way construction, and more particularly to an improved device to be used for that purpose in place of the ordinary wooden and metal keys now used, which all have the disadvantage of slackening back when subjected to vibration, concussion, or end thrust due to the creep of the rail. In my invention a wedge made of wrought-iron or soft steel is driven between specially-designed surfaces, which after the rail has been wedged up tightly against the jaw of the chair produce one or more bends in the wedge, which prevent it from slackening back when subjected to vibration, concussion, or end thrust due to the creeping of the rail. Six different forms of key are hereinafter described; but in all the essential features of the invention the bending of the wedge is maintained. For facility of description the pieces of metal between which the wedge is driven will hereinafter be termed "pads," the one placed next to the rail being termed the "rail-pad" and (where two are used) the one placed next to the chair-jaw being termed the "chair-pad."

I will now proceed to describe my invention, with reference to the annexed drawings, in which—

Figures 1 to 14 illustrate a key consisting of three parts adapted for use in an ordinary chair, in which the bending of the wedge is produced between the faces of two pads, Fig. 1 being a side elevation of an ordinary chair, Fig. 2 an end elevation, and Fig. 3 a plan of the same. Fig. 4 is a part plan showing a form of the faces of the rail and chair pads which cause two bendings in the wedge. Fig. 5 is a part plan showing a form of the faces of the rail and chair pads which bend the wedge to a curve. Fig. 6 is a sectional end elevation, and Fig. 7 is a plan, of the pads shown in position in Figs. 1, 2, and 3. Fig. 8 is a sectional end elevation, and Fig. 9 is a plan, of the chair-pad shown in Figs. 6 and 7. Fig. 10 is a sectional end elevation, and Fig. 11 is a plan, of the rail-pad shown in Figs. 6 and 7. Figs. 12, 13, and 14 show the shape of the wedge. Figs. 15 to 24 illustrate a key consisting of two parts to be used in a special chair, in which the bending of the wedge is produced between a rail-pad and the jaw of the chair, Fig. 15 being a side elevation, Fig. 16 an end elevation, and Fig. 17 a plan, of a special chair. Fig. 18 is an end elevation of the rail-pad shown in position in Figs. 15, 16, 17, and 24. Fig. 19 is a back elevation of the same, showing the side pressed against the rail; and Fig. 20 is a plan of the same. Figs. 21 and 22 show the construction of the wedge. Fig. 23 is a part plan of the outer jaw of the chair; and Fig. 24 is the same view as Fig. 15, but showing the key inserted on the gage-line side of the rail instead of on the outside, as in that figure. Figs. 25 to 35 illustrate a key consisting of three parts to be used in an ordinary chair, in which the bending of the wedge is produced between two pads, Fig. 25 being a side elevation, Fig. 26 an end elevation, and Fig. 27 a plan, of an ordinary chair. Fig. 28 is the same as Fig. 25, but showing an alternative construction of the rail-pad. Figs. 29 and 30 show details of the wedge. Fig. 31 is an end elevation, Fig. 32 a side elevation, and Fig. 34 a plan, of the chair-pad, while Figs. 33 and 35 are respectively an end elevation and a plan of the rail-pad. Figs. 36 to 45 illustrate a key consisting of two parts to be used in a special chair in which the bending of the wedge is produced between a rail-pad and the jaw of the chair, Fig. 36 being a side elevation, Fig. 37 an end elevation, and Fig. 38 a plan, of the special chair. Fig. 39 shows a sectional elevation, and Fig. 40 a plan, of the rail-pad used in Figs. 36, 37, and 38. Figs. 41 and 42 show details of the wedge. Fig. 43 is a plan of an alternative form of the special chair; and Figs. 44 and 45 show, respectively, a sectional elevation and a plan of the rail-pad used in Fig. 43. Figs. 46 to 55 illustrate a key consisting of two parts, intended to be used in an ordinary chair, in which the bending of the wedge is produced between the rail-pad and the jaw of chair, Fig. 46 being a side elevation, Fig. 47 an end elevation, and Figs. 48 and 53 plans, of an ordinary chair. Fig. 49 is an end elevation, and Fig. 50 a plan, of the rail-pad, while Figs. 51 and 52 show details of the wedge shown in Figs. 46, 47, and 48, and Figs. 54 and 55 the details of that shown in Fig. 53. Figs. 56 to 65 illustrate a key consisting of three parts, to be used in an ordinary chair, in which the bending of the wedge is produced between two pads.

In Figs. 1, 2, and 3, $a$ is an ordinary chair, with $b$, a double-headed rail, between the chair-jaws $c\ d$. The key shown separately in Figs. 6 to 14 consists of three parts—namely, the chair-pad $e$, the rail-pad $f$, and the wedge $g$—and is shown in position as when the rail is keyed up. The chair-pad $e$ has shoulders $h\ i$, made to overlap the sides of the jaw $c$ of the chair, as shown in Figs. 1, 2, and 3. Other shoulders $j\ k$, Figs. 7 and 9, are also provided, between which the rail-pad $f$ rests. On the inner faces of the said pads there are raised surfaces $l\ m$ on the chair-pad $e$ and $n$ on the rail-pad $f$, which serve to produce the required bend in the wedge. The wedge $g$ (shown separately in Figs. 12, 13, and 14) is tapered on two opposite sides, as at $o\ p$ in Fig. 13, the other sides being parallel. This form of key is to be used as follows: The rail-pad $f$ is placed between the shoulders $j\ k$ of the chair-pad $e$, as shown in Fig. 7. The two are then placed in the chair between the flange of the rail $b$ and the chair-jaw $c$ with the shoulders $h\ i$ of the chair-pad $e$ overlapping the sides of the chair. The wedge $g$ is inserted between the two pads in the slot $z$. (Shown in Figs. 6, 8, and 10.) As the wedge is driven home the pads are separated and forced against the chair-jaw $c$ and the flange of the rail, which in turn is forced against the chair-jaw $d$. At the same time the pressure put upon the middle of the wedge by the raised surface $n$ of the rail-pad $f$ acting midway between the raised surfaces $l\ m$ on the chair-pad $e$ causes it to bend, whereby it becomes locked in its place. During the driving of the wedge, or afterward by end thrust or creep of the rail, the pads $e$ and $f$ are prevented from moving endwise in or out of the chair by the shoulders $h\ i$ of the former overlapping the sides of the chair-jaw $c$, and the shoulders $j\ k$ overlapping the ends of the latter. Instead of a single bend in the wedge being produced as above described the chair-pad $e$ may have two raised surfaces $s\ t$ and the rail-pad $f$ three raised surfaces $u\ v\ w$, as in Fig. 4, which, it is obvious, will cause two bends in the wedge, or, as shown in Fig. 5, the bend in the wedge may partake of the nature of a curve of any desired order by making the acting face of the chair-pad $e$ of a convex shape, while the corresponding face of the rail-pad $f$ may take a concave form with two raised surfaces $q\ r$.

In Figs. 15, 16, 17, and 24, $x$ is a special form of chair, having a rib or projection $y$, Figs. 17 and 23, cast on the inner face of the jaw $c$. $b$ is a double-headed rail between the chair-jaws $c\ d$. The key shown separately in Figs. 18 to 23 consists of two parts—namely, the rail-pad 1 and the wedge 2—and is shown in Figs. 15, 16, 17, and 24 in position as when the rail is keyed up. The rail-pad 1 has arms 3 and 4, stiffened by webs 12 and 13, made to embrace the sides of the jaw $c$ of the chair $x$, as shown in Figs. 15, 16, 17, and 24. On the inner side of the rail-pad 1—that is, the side facing the jaw $c$ of the chair when in position—are provided two raised surfaces 5 and 6, in Figs. 17 and 20. The wedge 2 is tapered on two opposite sides, as in Fig. 21, the other two sides being flat and parallel, as in Fig. 22. In Figs. 17 and 21 is shown a slot 7 in the wedge, and on the width of this slot depends the degree of flexure in the wedge when driven up. In Fig. 17 the rib or projection $y$ on the jaw $c$ of the chair is shown tapered in one direction only; but in Fig. 23 it is shown tapered in both directions, so that the wedge may be inserted from either side of the chair. In both cases the degree of taper given to the projection $y$ agrees with the taper of the wedge. In Fig. 24 the key is shown in position on the inside or gage-line side of the rail, whereas in the other views it is shown in the more usual position on the outside of the rail. In use the rail-pad 1 is placed in the chair with its arms 3 and 4 embracing the jaw $c$ of the chair. The wedge 2 is inserted in the guide-slot $z$ in the arms of the pad, Figs. 18 and 20, one of its tapered edges bearing against the raised surfaces 5 and 6 of the pad, the other against the rib $y$ on the chair-jaw $c$. The wedge is then driven home and the pressure on the edge bearing against the chair-jaw forces the pad against the flange of rail, which in turn is forced against the chair-jaw $d$. The pressure at the point $y$ on one side of the wedge and at the points 5 and 6 on the opposite side results in the bending of the wedge, which bending locks it securely to the chair jaw and pad.

In Figs. 25 to 28, $a$ is an ordinary chair with a double-headed rail $b$ between the jaws $c\ d$. The key (shown separately in Figs. 29 to 35) consists of three parts—namely, the rail-pad 1, the chair-pad 8, and the wedge $g$—and is shown in position in Figs. 25 to 28. The rail-pad 1, as in that last described, is provided with arms 3 and 4, strengthened by webs 12 and 13, made to overlap the jaw $c$; also raised surfaces 5 and 6, Figs. 27 and 35, against which bears one of the tapered sides of the wedge $g$. The chair-pad 8 fits between the arms 3 and 4 of the rail-pad, which prevent its endwise movement. To prevent its falling from between the said arms, it is provided with shoulders or projections 9 and 10, which rest on the arms of the rail-pad. It has, further, a raised surface 11, between which and those of the rail-pad the wedge is bent when driven up. In Fig. 28 is shown a key similar to that just described, but in which the rail-pad 1 has projections 14 and 15, adapted to bear against the inside fishing-surfaces of the tables of the rail instead of against the web. In using this form of a three-part key the rail-pad 1 and the chair-pad 8 are placed in the gaps between the rail and chair jaw and the wedge is inserted in the guide-slot z, Figs. 33 and 35, provided for it in the arms of the rail-pad, with one of its tapered sides bearing against the point 11 and the other against the points 5 and 6. When driven in, the wedge forces apart the two pads, so securing the rail to the chair, and, becoming bent, is itself securely locked.

In Figs. 36 to 38 x is a special form of chair, having a rib or projection y cast on the inner face of the jaw c, and in Fig. 43, 17 and 18 show two such ribs. The said four figures show a double-headed rail b between the jaws c d. The key intended to be used with the single-ribbed chair x is shown in position in Figs. 36, 37, and 38 and separately in Figs. 39 and 40, and the key for use with the double-ribbed chair 16 is shown in position in Fig. 43 and separately in Figs. 44 and 45. In the former case the key consists of two parts—the rail-pad 19 and the wedge g. As shown in Figs. 36 to 40, the rail-pad has arms 20 and 21, which embrace the rib y on the jaw c of the chair x, so as to prevent its endwise movement. 22 and 23 are the raised surfaces between which and the rib y the wedge g, Figs. 37, 38, 41, and 42, when driven through the guide-slot z, Figs. 39 and 40, becomes bent. In the second case the key also consists of two parts—the rail-pad 24 and the wedge g. As shown in Figs. 43, 44, and 45, the rail-pad has arms 25 and 26, strengthened by stiffening-webs 27 and 28, which embrace the sides of the jaw c of the chair 16, Fig. 43. The wedge g, Figs. 41, 42, and 43, is driven through the guide-slot z, Fig. 45, between the raised surface 29 on the rail-pad and the two ribs 17 and 18 on the chair-jaw and bent so as to lock it in place. The two ribs 17 and 18 are cast with their surfaces against which the wedge bears parallel to the longitudinal axis of the rail when in position. Thus with this key one chair serves for both right and left hand chairs, the necessary taper being put on the surface 29 of the rail-pad.

In Figs. 46, 47, and 48 a is an ordinary chair with a double-headed rail b between the jaws c d. The key shown separately in Figs. 49 to 52 consists of two parts, the rail-pad 30 and the wedge g. The rail-pad has arms 31 and 32, which embrace the sides of the chair-jaw c to prevent its moving endwise. The rail-pad being placed as shown in Figs. 46, 47, and 48, the wedge g is inserted in the guide-slot z in the arms 31 and 32 of the rail-pad 30, so that one of its tapered sides bears against the inner face of the chair-jaw c and the other against the ends 33 and 34 of the guide-slot z, and is driven in and bent. In Fig. 53 the rail-pad used is the same as that just described; but the wedge used is the one shown separately in Figs. 54 and 55. This wedge is made parallel on all four sides, but on one side has a raised surface 37, which is beveled down toward the nose of the wedge and united with its normal surface. The nose of the wedge on the side opposite to that on which is the raised surface is beveled off, as shown at 42, to facilitate insertion of the wedge in the guide-slot. When driven home, the point of pressure causing the bending of the wedge is at 37, midway between the points 33 and 34.

In Figs. 56, 57, and 58 a is an ordinary chair with a double-headed rail b between the jaws c d. The key shown separately in Figs. 59 to 65 consists of three parts—namely, the chair-pad 38, the rail-pad 30, and the wedge 39—and is shown in position in Figs. 56, 57, and 58. The rail-pad is provided with arms 31 and 32 to embrace the sides of the chair-jaw c, as shown in Figs. 56, 57, and 58, to prevent any endwise movement. Through the said arms are guide-slots z, Figs. 64 and 65, in which are placed the chair-pad 38 and the wedge 39. The chair-pad, Figs. 59, 60, and 61, has a raised surface 40 and a shoulder 41, which when in position rests against the arm 32 of the rail-pad and prevents its endwise movement while the wedge is being driven in. The wedge 39 (shown separately in Figs. 62 and 63) is tapered on two opposite sides, the other two being parallel. Its nose, on the side which bears against the rail-pad, is beveled off, as at 42, to facilitate its insertion in the guide-slot z in the arms 31 and 32 of the rail-pad. When driven in, one of its tapered sides bears against the sides 33 and 34 of the guide-slots z and the other against the raised surface 40 of the chair-pad. Although the inside surface of the jaw c, against which the chair-pad 38 bears, is in plan, Fig. 58, shown tapered in the usual manner, it may instead be made parallel to the longitudinal axis of the rail when in position. The necessary taper for the wedge will then be made on the chair-pad or on the rail-pad, or partly on either. This arrangement permits of one chair doing duty in place of the right and left hand chairs in ordinary use.

The wedge in all cases may be and preferably is made of wrought-iron or soft steel, and the chair and rail pads in all their forms, except the chair-pad illustrated in Figs. 49, 50, 59, 60, and 61, which may preferably be stamped or drop-forged, may be of cast-iron or cast-steel. The wedge in all cases must be of a sufficient section to be stiff enough to bear being driven in between the rail and chair pads or between the rail-pad and jaw of chair without commencing to bend until the rail has been firmly keyed up in the chair. The bending of the wedge may be compared to that of a loaded beam, the bending moment arising from its being subjected to a resultant pressure at about the middle of its length midway between two supporting-points, through which pass the reacting forces equal to half the said resultant pressure. The key is equally well adapted for use in right or left handed chairs, as also for non-handed chairs or chairs with jaws parallel on their inside faces to the longitudinal axis of the rail when in position, and even in bad castings where the inner faces of the jaws are irregular the key will firmly wedge the rail up. In those alternative forms of rail-pads illustrated in Figs. 36 to 65 a particular advantage is that the wedge is far enough from the rail-flange to clear the fish-plate at the rail-joints, and therefore the end chairs may be placed close up to the ends of the fish-plates.

I claim—

1. The combination in means for securing railroad-rails of two separable parts adapted to face one another and having respectively on their opposing faces raised surfaces staggered with regard to one another and a wedge adapted to be driven between said surfaces and to be bent in an undulatory manner between said raised surfaces.

2. The combination in a railway-key of two separable pads having on their opposing faces raised surfaces staggered with regard to one another, and a wedge adapted to be driven between said pads and to be bent thereby in an undulatory manner between said raised surfaces.

3. The combination in a railway-key of two separable pads having on their opposing faces raised surfaces staggered with regard to one another and a wedge adapted to be driven between said pads and to be bent thereby in an undulatory manner between said raised surfaces, the one pad having flanges engaging the other pad.

4. The combination in a railway-key of two separable pads having on their opposing faces raised surfaces staggered with regard to one another and a wedge adapted to be driven between said pads and to be bent thereby in an undulatory manner between said raised surfaces, the said pads having flanges adapted to engage the rail-chair.

In witness whereof I have signed this specification in the presence of two witnesses.

JOHN ALEXANDER COLQUHOUN.

Witnesses:
HENRY VINCENT WILLIAMS,
KAFIEL CHANDU MULLIK.